United States Patent
Ho et al.

(10) Patent No.: US 8,739,157 B2
(45) Date of Patent: May 27, 2014

(54) SYSTEM AND METHOD FOR MANAGING CLOUD DEPLOYMENT CONFIGURATION OF AN APPLICATION

(75) Inventors: Ricky Ho, San Jose, CA (US); Jim Donahue, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 408 days.

(21) Appl. No.: 12/869,533

(22) Filed: Aug. 26, 2010

(65) Prior Publication Data
US 2014/0040656 A1     Feb. 6, 2014

(51) Int. Cl.
*G06F 9/455* (2006.01)
*G06F 9/445* (2006.01)
*G06F 11/00* (2006.01)
*G06F 9/50* (2006.01)
*G06F 11/14* (2006.01)

(52) U.S. Cl.
CPC .............. *G06F 9/5077* (2013.01); *G06F 8/63* (2013.01); *G06F 11/1484* (2013.01)
USPC .................................. 718/1; 717/174; 714/3

(58) Field of Classification Search
CPC ...... G06F 9/5077; G06F 8/63; G06F 11/1484
See application file for complete search history.

(56) References Cited

U.S. PATENT DOCUMENTS

| | | | |
|---|---|---|---|
| 7,409,694 B2* | 8/2008 | Forin et al. ..................... 719/331 |
| 2004/0015600 A1* | 1/2004 | Tiwary et al. ................. 709/234 |
| 2010/0223378 A1* | 9/2010 | Wei ............................... 709/224 |
| 2010/0251002 A1* | 9/2010 | Sivasubramanian et al. ..... 714/2 |
| 2011/0023001 A1* | 1/2011 | Giffel ............................ 716/122 |
| 2012/0284713 A1* | 11/2012 | Ostermeyer et al. ............. 718/1 |

* cited by examiner

*Primary Examiner* — Camquy Truong
(74) *Attorney, Agent, or Firm* — Schwegman Lundberg & Woessner, P.A.

(57) ABSTRACT

A system is provided to manage cloud deployment configuration of a computing application. The system comprises a request detector, a retrieving module, a manager loader, a configuration change request detector, and a configuration module. The request detector may be configured to detect a request to install a manager agent on an instance of a virtual machine executing a computing application within a virtualization service. The retrieving module may be configured to obtain a manager agent object for loading the manager agent, and install the manager agent on the instance. The manager loader may be configured to invoke the manager agent to collect metrics for the computing application. The configuration change request detector may be configured to receive an instruction to alter cloud deployment configuration of the computing application. The configuration module may be configured to automatically alter the cloud deployment configuration of the computing application in response to the instruction.

22 Claims, 4 Drawing Sheets

SYSTEM AND METHOD FOR MANAGING CLOUD DEPLOYMENT CONFIGURATION OF AN APPLICATION

This disclosure relates generally to the technical fields of software and/or hardware technology and, in one example embodiment, to system and method to manage cloud deployment configuration of a computing application.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The phrase "cloud computing" refers to an architectural paradigm, in which computation is moved from local servers to a remote service that provides computation as a commodity or utility. A "cloud" is typically a large collection of shared commodity computation resources that can be interchangeably provisioned in response to clients' computation requests. Cloud computing is frequently used in software-as-a-service (SaaS) application architectures and may be viewed as an implementation choice for application deployment that leverages shared resources and improved cost structure of the cloud. A cloud computing approach may be used to implement a variety of computational paradigms, such as virtual machines, jobs, remote procedure calls, traditional servers, etc.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
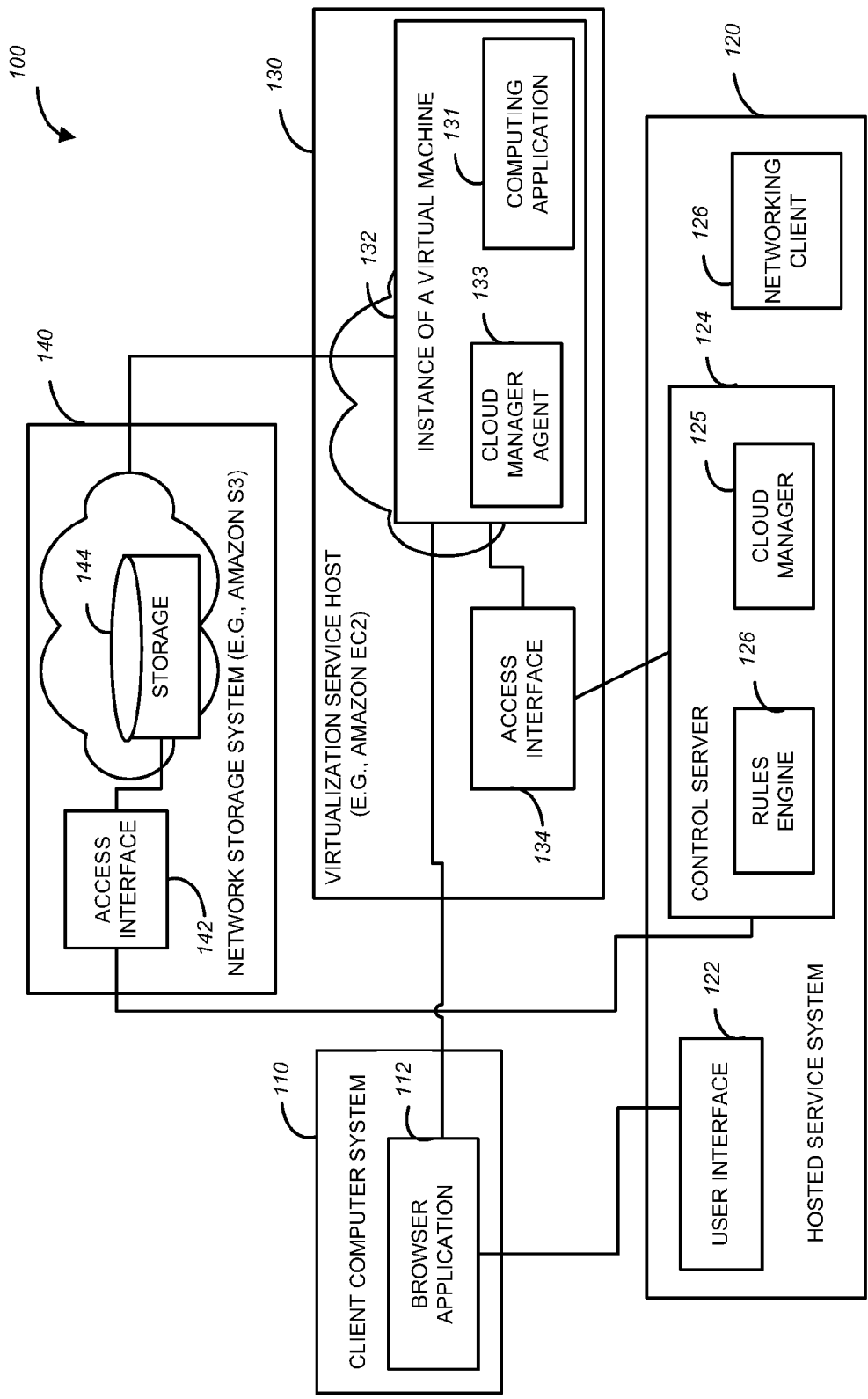
FIG. 1 is a block diagram showing an architecture within which a method and system to manage cloud deployment configuration of a computing application may be implemented, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A computing application (also referred as merely an application) may be made available to users by deploying the application on one or more virtual instances of a machine running on a cloud, i.e., within a public or a private virtualization space, such as, e.g., the virtualization space provided by Amazon Elastic Compute Cloud (EC2) service. A virtualization service provider may also be referred to a cloud provider.

A user can access a provider's web site and request to launch a computing application that can be deployed remotely on a plurality of virtual instances of a machine (on a cloud) such that the user no longer is required to deploy the computing application locally, within their own data center, on their own hardware. A request may be triggered by a user, e.g., by activating a visual control such as a "Start" button presented on a web page. In response to the request, the cloud provider may be instructed to access one or more machine images containing the application description and load the one or more machine images onto the physical machines provided by the cloud provider and make it accessible to the user via a network. A machine image is a read-only boot image that is used for launching an instance of a virtual machine running one or more components of the requested computing application. One or more machine images representing a computing application may be provided to a network storage system (e.g., AmazonS3) by a control server (also referred to as a controller).

A system that provisions and manages a computing application hosted on one or more virtual instances of a machine may be referred to as a hosted service system. A hosted service system may include a cloud manager and may be configured to provide automated administration of a computing application, replacing the administration tasks that would otherwise be performed by the customer when running in an on-premise production deployment. The technology within an example hosted service system may hide the behavior of the underlying virtualization service, and provide instances of a computing application that are substantially indistinguishable (e.g., in terms of reliability, security, and performance) from local on-premise deployments of the computing application. For example, a hosted service system may provision and manage computing applications such as a generic content server, Adobe® LiveCycle® Enterprise Suite (ES) and Adobe® ConnectPro® offered by Adobe Systems Incorporated, etc.

The manner in which an application can be deployed on a cloud depends on application requirement with respect to resources on one hand, and also on the availability of resources that can be provided to the application by the virtualization service provider. Often, more than a single cloud deployment configuration for a computing application may satisfy application requirement given a particular resource inventory. For example, an application may be deployed on a cloud using varying number of virtual instances of a machine, the application may be deployed using different or multiple virtualization service providers, the virtual instance of a machine running the application (or one or more components of an application) may be started and stopped according to the need of the users, etc. One of these different cloud deployment configurations may be most cost effective (e.g., deploying the application on a fewer number of virtual instances of a machine), while another cloud deployment configuration may be characterized by greater performance at a higher cost (e.g., deploying the application on a greater number of virtual instances of a machine).

Due to fluctuations of workload associated with the computing application, as well as considering possible failure of various components of the computing application, a configuration that was determined to be optimal at a certain point in time with respect to a certain optimization goal may no longer be optimal at a different point in time or in view of a different optimization goal. Method and system are provided to continuously adjust cloud deployment configuration of a computing application in view of a highly dynamic environment. In one example embodiment, one or more infrastructure-level modules configured to address system failure, the need for scalability, etc. are provided as isolated infrastructure logic that can be added to the computing application via configuration changes. By separating the application modules and infrastructure-level modules a computing application can be developed with just application logic; the infrastructure logic may be added in by changes to the associated cloud deployment configuration at a later stage.

As will be described further below, with reference to FIG. 1-FIG. 4, the infrastructure mechanism to provide dynamic scaling and failure recovery for a computing application deployed on a cloud (also referred to as updating cloud deployment configuration of a computing application) comprises installing a cloud manager agent into every instance of a virtual machine where the computing application or any of its components is executing. The cloud manager agent may be configured to continuously extract system-level and application-level metrics from the computing application or a computing application component and provided the collected metrics to a cloud manager executing on a control server within a hosted service system, e.g., via a monitoring interface.

After obtaining the metrics collected by the cloud manager agent, the cloud manager may compute the basic data statistics and feed the computed statistics into a real-time rules engine that defines automatic reaction under different environment conditions. In one embodiment, the rules defined in the rules engine codify the expertise of the system operation team and provide immediate pre-defined action. For example, the application development team may be aware that the number of outstanding messages in the application queue will have a significant impact on the user's response time. In order to address this scenario, a "ManagedObject" may be provided as part of the manager agent to extract the queue size as a metric. A rule in the rules engine may be defined instructing the controller to take a certain action (e.g., to start more server machines to speed up the message processing in order to reduce the queue size) when the queue size is bigger than a certain threshold value. In addition to triggering immediate action, the collected metrics can also be used to determine trend information over time regarding the performance of the computing application. The method and system for dynamic resource monitoring of a computing application deployed on a cloud and for managing cloud deployment configuration may thus be used beneficially to store and process metrics collected over an extended time to derive meaningful insight with respect to application performance and usage. The plug-in mechanism, where a cloud manager agent is installed on an instance of a virtual machine executing a computing application, may allow for user-defined processing logic that may be made specific to the computing application. An example use case scenario is described below A computing application that can be deployed on a cloud (e.g., web application) may include different types of components, such as, e.g., portal services running inside application servers, a cache engine for performance improvement, a database, and other components. A web application may be configured to process different mixes of user transactions, such as, e.g., uploading content, creating a comment post, effectuating a purchase transaction for a user, creating a connection relationship between two user profiles in the context of a social network, etc. Each transaction may be characterized by workload that may vary according to the time of day as well as according to various other factors. The performance of a web application deployed on a cloud, which may be affected by fluctuating workload, may be optimized by dynamically adjusting cloud deployment configuration of the web application, based on the metrics collected by the cloud manager agent.

When using a cloud manager (also referred to as a dynamic monitor), specific details regarding various components of a web application may be defined and stored in a cloud deployment configuration object. The cloud deployment configuration may also capture scalability rules. For example, scalability and availability rules may be as follows. If the workload for content upload is higher than a certain throughput value, additional one or more units of application servers need to be added. If the database component of a web application has failed, start the hot standby database. If the no of messages transmitted between two systems is above a predetermined threshold value, trigger the action of turning on caching. If the hit rate of cache is too low, trigger the action to increase the cache size.

For longer term capacity planning, CPU and memory utilization metrics collected by the cloud manager agent may be provided, e.g., to a parallel MapReduce job where time-series algorithms, such as moving average, are being executed. The output result can be presented to users using graphs or charts.

A pluggable monitoring mechanism such as a cloud manager (provided at a control server) operating together with a cloud manager agent (executing on a virtual instance of a machine that runs a computing application) may be configured to permit an administrator to define arbitrary application level metrics for monitoring, as well as a set of fixed system level metrics. As mentioned above, a cloud manager provided at a control server may utilize a rules engine. A rules engine may be configured to allow an administrator to define extensible actions to be performed with respect to a computing application, e.g., growing and shrinking the number of instances of a virtual machine executing the computing application and its components, as well as reconfiguring the application-level parameters, sending email alerts, or activate or deactivate another set of rules to be available to the rules engine 126. One example of reconfiguring application-level parameters is shown in Table 1 below.

TABLE 1

```
Type: InhouseMySQL
    Domain: adobe
    Image: com.adobe.ozone.demo.MySQLWrapper
    Runtime: remotejvm
    Conditions:
        minimum("db_mo_numberOfRecords", 3) > 5
    SleepAfterFire:
        45
    Actions:
        start("InhouseMemcached", 1, "InhouseApp", 1)    if poolsize("InhouseApp") < 3
        start("CloudMemcached", 1, "CloudApp", 1)    if poolsize("InhouseApp") >= 3
    Conditions:
        maximum("db_mo_numberOfRecords", 3) < 4
    SleepAfterFire:
        45
    Actions:
        stop("CloudMemcached", 1, "CloudApp", 1)    if poolsize("CloudApp") > 0
        stop("InhouseMemcached", 1, "InhouseApp", 1)    if poolsize("CloudApp") == 0
Done:
```

The analytics logic provided by a cloud manager may also be made customizable. For example, a cloud manager may be configured to provide a view into the performance of a computing application beyond the current data by using mining and forecasting techniques and generating predictions with respect to future workload conditions and preemptively adjusting resource cloud deployment configuration for the computing application deployed on a cloud.

In one embodiment, a rules engine that cooperates with a cloud manager may provide a hierarchical management model that that may be utilized beneficially for large scale deployment. For example, instead of just monitoring a set of instances of a virtual machine associated with a computing application, one instance of a cloud manager may be configured to act as a low-level manager and feed its data to other instances of a cloud manager that are configured as upper-level cloud managers.

An example architecture within which method and system to manage cloud deployment configuration of a computing application hosted by a plurality of virtual nodes may be implemented is described with reference to an architecture diagram illustrated in FIG. 1. The architecture 100 may include a client computer system 110 and a hosted service system 120. In one example embodiment, the hosted service system 120 comprises a control server 124, a user interface 122, and a networking client 126 and may be configured to provision and manage a computing application (e.g., an enterprise SaaS product) utilizing a cloud-based computing service as a virtualization infrastructure. The hosted service system 120 further includes a secure networking client 126 to provide a bidirectional, encrypted, compressed connection between a machine in the end-user's secure network environment (e.g., the client computer system 110) and one or more instances of a virtual machine running within the virtualization infrastructure (the computing application 132). The networking client 126 manages various aspects of transmission control protocol (TCP) traffic forwarding, encryption, and network discovery, such that the user can access the computing application 131 as if it was running locally on the user's machine. In this mode, the user's network security envelope is extended to surround the computing application 131 using comparable levels of encryption and protection against network security threats. The user interface 122, in one embodiment, provides both an end-user's and a system administrator's view of the instance of a virtual machine 132 and also permits issuing control operations to the instance of a virtual machine 132 and permits viewing the resulting changes in the state of the instance of a virtual machine 132 and the computing application 131. For example, where the computing application 131 is a content server, an end-user may manipulate various electronic forms. The user interface 122 may also serve as a source of information for the hosted service system 120, including documentation, downloads, and support. The user interface 122, in one embodiment, uses Adobe® Flex® software, offered by Adobe Systems Incorporated, as the user interface technology for the implementation of the user interface. The user interface 122, in one embodiment, uses an XML (Extensible Markup Language)-based representational state transfer (REST) style secure communications protocol to synchronize its operations with a control server 124. A request to access the user interface 122 may be authenticated using one of a variety of authentication techniques. The control server 124 may include a database to store information pertaining to various aspects of system usage. The control server 124, in one embodiment, runs within a standard Hypertext Transfer Protocol Secure (HTTPS)-compliant web server and may be deployed as a publically accessible web application that is available outside a firewall. The control server 124, in one embodiment, is implemented using Ruby on Rails™ technology.

Cloud-based computing services, as shown in FIG. 1, are provided by a virtualization service host 130 and a network storage service 140. In one embodiment, a hosted service system 120 utilizes Amazon EC2 as a virtualization service and Amazon Simple Storage Service (Amazon S3) as a network storage service. In some embodiments, the hosted service system 120 may utilize more than one virtualization service host, e.g., one host being Amazon EC2 and another host provided by Adobe Systems Incorporated. The client computer system 110 and the hosted service system 120 may be in communication with each other via a communications network that may be a public network (e.g., the Internet). The control server 124, in one example embodiment, provides coordination between the components of the architecture 100, and specifically provides administration and monitoring of the virtualization service host 130 and also may be configured to audit system usage and resource allocation with respect to the computing application 131.

As mentioned above, a user in control of the client computer system 110 may send a request to the hosted service system 120 to load a computing application 131. The request may be initiated via a user interface 122 provided by the hosted service system 120 to the client computer system 110 via the browser application 112. The request from the client computer system 110 to load the computing application 131 is received at the control server 124, which responds to the request by activating an access interface 134 provided by the virtualization service host 130. The virtualization service host 130 accesses the storage 144 of the network storage system 140 to obtain one or more machine images in order to load the instance of a virtual machine 132 executing the computing application 131. The machine images can be uploaded to the network storage system 140 by the control server 124 utilizing the access interface 142 provided with the network storage system 140.

In one example embodiment, as shown in FIG. 1, a cloud manager 125, implemented by one or more processors, may be executing on the control server 124. The cloud manager 125 may be configured to obtain and process metrics collected for the instance of a virtual machine 132 and for the computing application 131, e.g., utilizing a rules engine. The cloud manager may comprise a user interface to permit a user to edit, add, and delete rules provided to the rules engine. The metrics that are obtained and processed by the cloud manager 125 may be collected at the instance of the virtual machine 132 utilizing a cloud manager agent 133. The cloud manager agent may be installed on the instance of the virtual machine 132 in response to a request from an administrator or automatically, after the instance of the virtual machine 132 has been started on a cloud. The metrics collected by the cloud manager agent 133 may be used for determining an optimized cloud deployment configuration for the computing application 131, as well as for determining trend data with respect to resource consumption, performance and other aspect of the execution of the computing application 131. The trend data may be used to automatically determine that another cloud deployment configuration of the computing application 131 may be more advantageous and, in response, automatically alter cloud deployment configuration of the computing application 131.

Figure 2:
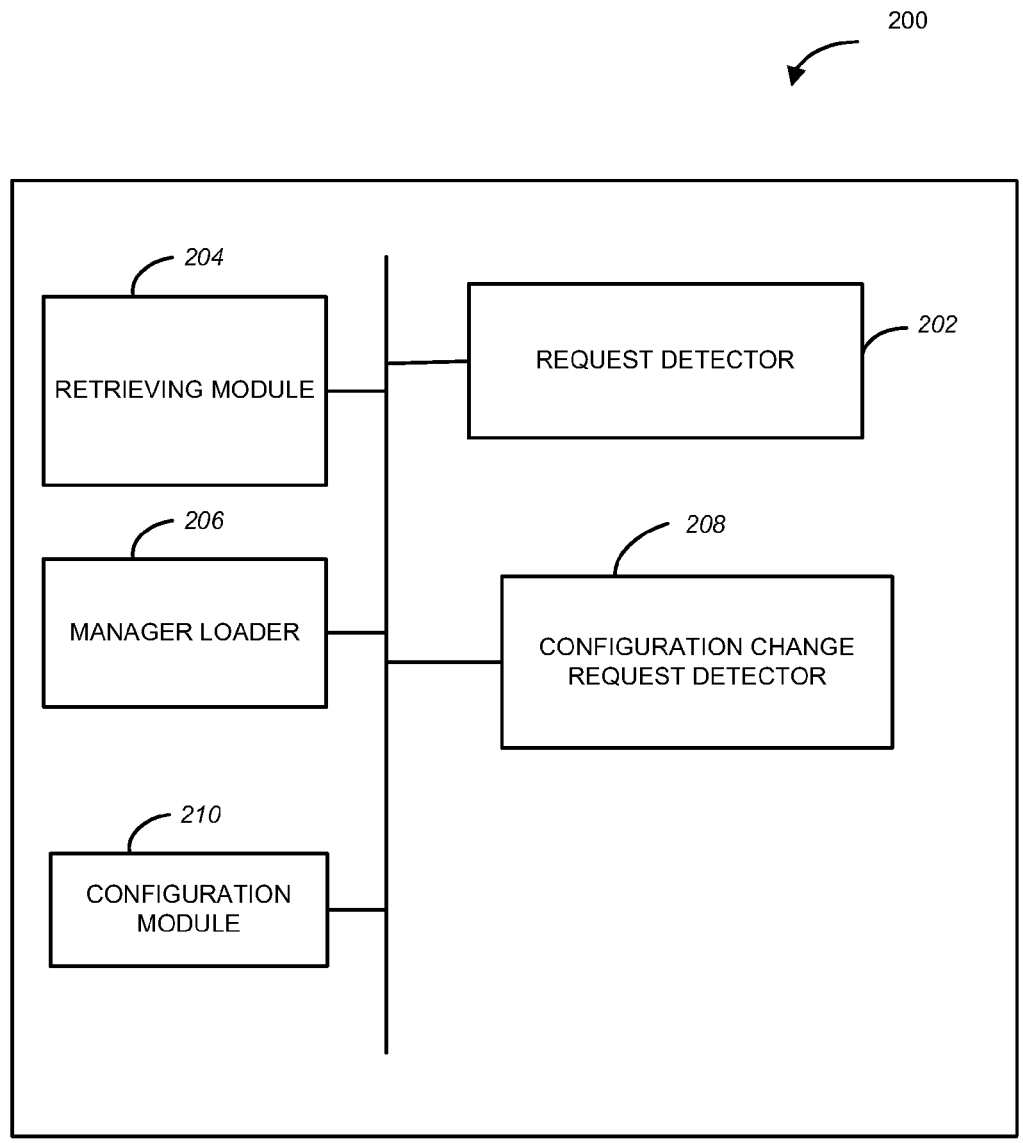
FIG. 2 is a block diagram illustrating a system to manage cloud deployment configuration of a computing application, in accordance with an example embodiment.

FIG. 2 is a block diagram illustrating a system 200 for managing a cloud deployment configuration for a computing application. The system 200 comprises a request detector 202, a retrieving module 204, a manager loader 206, a configuration change request detector, and a configuration module 210. The request detector 202 may be configured to detect a request to install a manager agent on an instance of a virtual machine, where the instance is executing a computing application within a virtualization service. The retrieving module 204 may be configured to obtain a manager agent object for loading the manager agent, and also to install the manager agent on the instance of a virtual machine. The manager loader 206 may be configured to invoke the manager agent to collect metrics for the computing application. The metrics being collected for the computing application are application-level metrics and/or system-level metrics. The configuration change request detector 208 may be configured to receive an instruction to alter cloud deployment configuration of the computing application. Such instruction may be generated based on application of one or more rules to the metrics collected for the computing application. The configuration module 210 may be configured to automatically alter the cloud deployment configuration of the computing application in response to the instruction.

In one embodiment, the computing application comprises a plurality of components, and the instruction to alter cloud deployment configuration of the computing application may be to alter configuration of the component or to recover from a failure of the component. The instruction may also be to start another instance of a virtual machine executing at least one component of the computing application. Example operations performed by the system 200 are discussed below with reference to FIG. 3.

Figure 3:
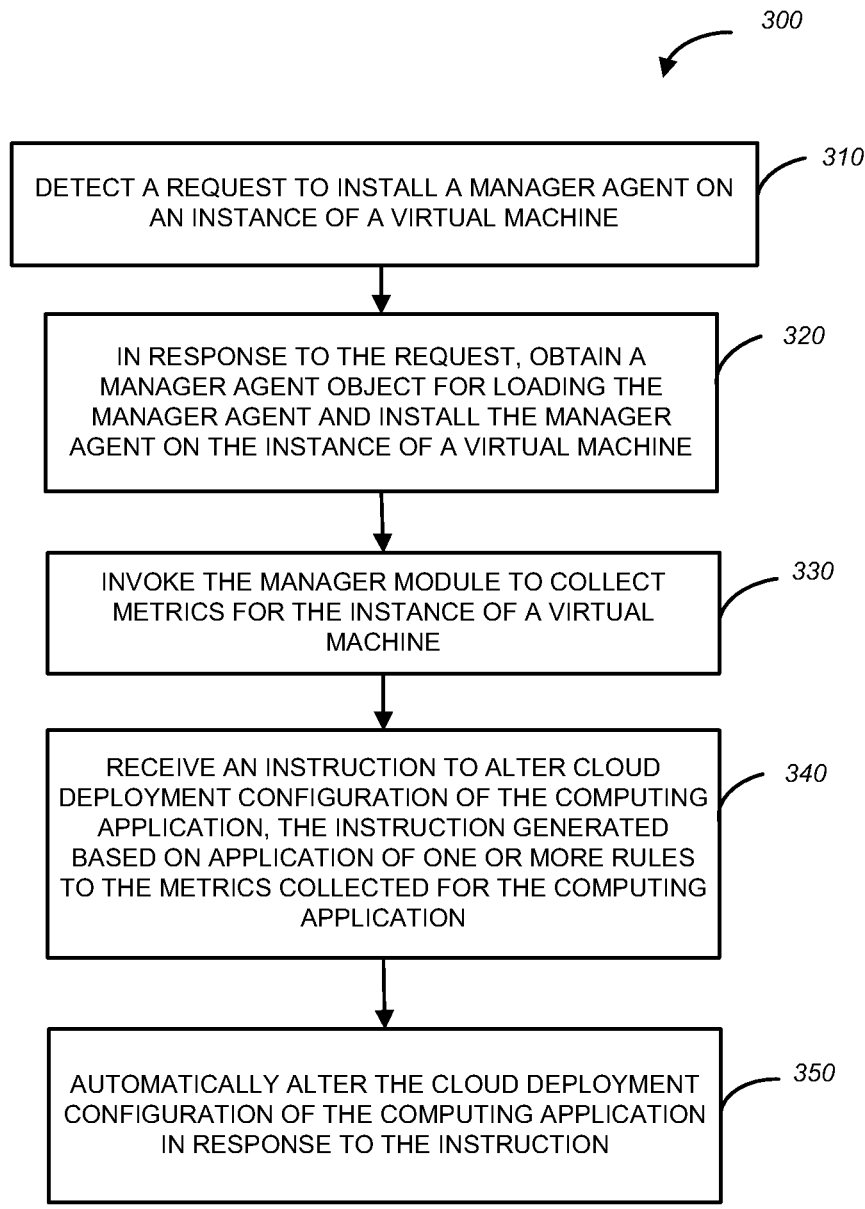
FIG. 3 is a flow chart illustrating a method to manage cloud deployment configuration of a computing application, in accordance with an example embodiment.
Figure 4:
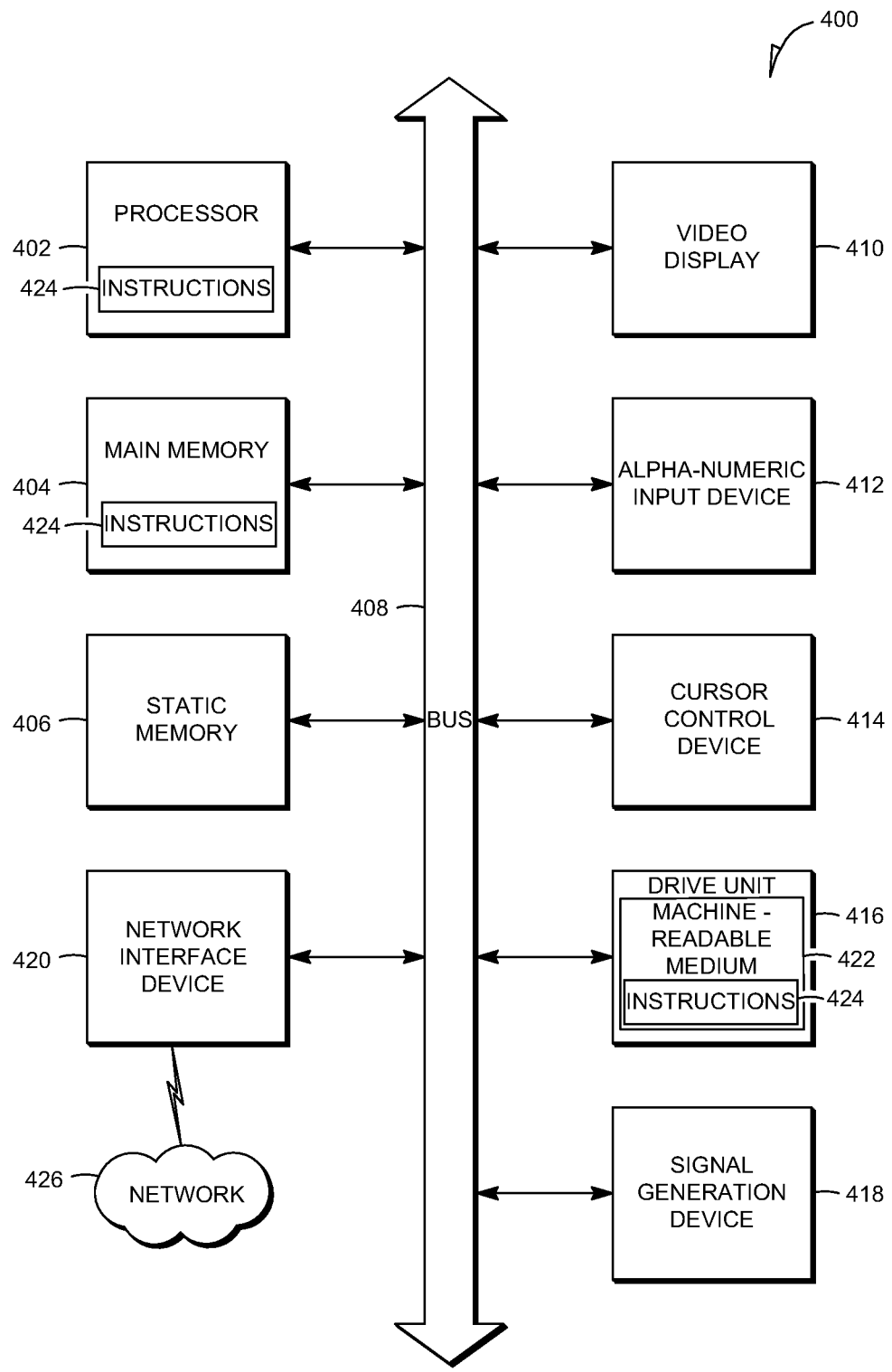
FIG. 4 is a diagrammatic representation of a machine in the example form of a computer system within which a set of instructions, for causing the machine to perform any one or more of the methodologies discussed herein, may be executed.

FIG. 3 is a flow chart illustrating a method 300 for managing a cloud deployment configuration for a computing application, in accordance with an example embodiment. The method 300 may be performed by processing logic that may comprise hardware, software (such as run on a general purpose computer system programmed to perform particular functions pursuant to instructions from program software or on a dedicated machine), or a combination of both. The processing logic, according to example embodiments, may reside in or comprise any of the modules shown in FIG. 2.

As shown in FIG. 3, the method 300 commences with operation 310, where the request detector 202 of FIG. 2 detects a request to install a manager agent on an instance of a virtual machine, where the instance is executing a computing application within a virtualization service. At operation 320, the retrieving module 204 of FIG. 2 obtains a manager agent object for loading the manager agent, and installs the manager agent on the instance of a virtual machine. At operation 330, the manager loader 206 of FIG. 2 invokes the manager agent to collect metrics for the computing application. The metrics being collected for the computing application are application-level metrics and/or system-level metrics. At operation the configuration change request detector 208 of FIG. 2 receives an instruction to alter cloud deployment configuration of the computing application. Such instruction may be generated based on application of one or more rules to the metrics collected for the computing application. At operation the configuration module 210 of FIG. 2 automatically alters the cloud deployment configuration of the computing application in response to the instruction.

FIG. 6 is a diagrammatic representation of a machine in the example electronic form of a computer system 600 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) cursor control device 614 (e.g., a mouse), a disk drive unit 616, a signal generation device 618 (e.g., a speaker) and a network interface device 620.

The disk drive unit 616 includes a computer-readable (or machine-readable) medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

Thus, method and system to manage cloud deployment configuration of a computing application have been described. While some example approaches described herein may be used with ADOBE® products, the techniques described herein may be utilized beneficially with various other products.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
    detecting a request to install a manager agent on an instance of a virtual machine to collect metrics, the instance executing a computing application within a virtualization service;
    in response to the request, accessing a manager agent object for loading the manager agent and installing the manager agent on the instance of the virtual machine to collect the metrics for the computing application;
    invoking the manager agent on the instance of the virtual machine that is executing the computing application to collect the metrics for the computing application;
    providing the collected metrics to a cloud manager executing within a hosted service system, the cloud manager being in communication with a rules engine, the rules engine to provide one or more rules for determining, based on the collected metrics, an instruction to automatically alter a current cloud deployment configuration of the computing application;
    receiving the instruction to automatically alter the current cloud deployment configuration of the computing application, the instruction generated based on trend data derived from the metrics collected over a trend time period for the computing application by the manager agent on the instance of the virtual machine that is executing the computing application; and
    automatically altering, using a processor of a machine, the current cloud deployment configuration of the computing application in response to the instruction generated based on the trend data.

2. The method of claim 1, wherein the metrics for the computing application are application-level metrics.

3. The method of claim 1, wherein the metrics for the instance of the computing application are system-level metrics.

4. The method of claim 1, comprising providing the collected metrics to a cloud manager executing within a hosted service system, the cloud manager being in communication with a rules engine.

5. The method of claim 4, wherein the rules engine is to provide one or more rules for determining, based on the collected metrics, the instruction to automatically alter the current cloud deployment configuration of the computing application.

6. The method of claim 1, further comprising automatically determining an alternative cloud deployment configuration using the trend data, the current cloud deployment configuration being altered to the alternative cloud deployment configuration.

7. The method of claim 4, wherein the cloud manager comprises a user interface to permit a user to edit, add, and delete rules provided to the rules engine.

8. The method of claim 4, wherein the cloud manager is to apply forecasting techniques to the collected metrics to generate predictions with respect to future workload conditions, the altering of the cloud deployment configuration of the computing application comprising preemptively adjusting the cloud deployment configuration for the computing application based on the generated predictions.

9. The method of claim 1, wherein:
    the computing application comprises a component from a plurality of components; and
    the instruction is to alter configuration of the component.

10. The method of claim 9, wherein the instruction is to recover from a failure of the component.

11. The method of claim 1, wherein the instruction is to start another instance of a virtual machine executing at least one component of the computing application.

12. The method of claim 1, wherein the trend time period is an extended time period long enough to derive meaningful trend data on application performance and usage.

13. A system comprising:
a processor of a machine;
a request detector to detect a request to install a manager agent on an instance of a virtual machine to collect metrics, the instance executing a computing application within a virtualization service;
a retrieving module to:
  access a manager agent object for loading the manager agent on the instance of the virtual machine that is executing the computing application, and
  install the manager agent on the instance of virtual machine to collect the metrics for the computing application;
a manager loader to invoke the manager agent on the instance of the virtual machine that is executing the computing application to collect the metrics for the computing application;
a communications module to provide the collected metrics to a cloud manager executing within a hosted service system, the cloud manager being in communication with a rules engine, the rules engine to provide one or more rules for determining, based on the collected metrics, an instruction to automatically alter a current cloud deployment configuration of the computing application;
a configuration change request detector to receive the instruction to alter the current cloud deployment configuration of the computing application, the instruction generated based on trend data derived from the metrics collected over a trend time period for the computing application by the manager agent on the instance of the virtual machine that is executing the computing application; and
a configuration module to automatically alter, using the processor, the current cloud deployment configuration of the computing application in response to the instruction generated based on the trend data.

14. The system of claim 13, wherein the metrics for the computing application are application-level metrics.

15. The system of claim 13, wherein the metrics for the instance of the computing application are system-level metrics.

16. The system of claim 13, comprising a communications module to provide the collected metrics to a cloud manager executing within a hosted service system, the cloud manager being in communication with a rules engine.

17. The method of claim 16, wherein the rules engine is to provide one or more rules for determining, based on the collected metrics, the instruction to automatically alter the current cloud deployment configuration of the computing application.

18. The method of claim 16, wherein the cloud manager comprises a user interface to permit a user to edit, add, and delete rules provided to the rules engine.

19. The method of claim 13, further comprising automatically determining an alternative cloud deployment configuration using the trend data, the current cloud deployment configuration being altered to the alternative cloud deployment configuration.

20. The system of claim 13, wherein:
the computing application comprises a component from a plurality of components; and
the instruction is to alter configuration of the component.

21. The method of claim 20, wherein the instruction is to recover from a failure of the component.

22. A tangible machine-readable storage medium having instruction data to cause a machine to perform operations comprising:
detecting a request to install a manager agent on an instance of a virtual machine to collect metrics, the instance executing a computing application within a virtualization service;
accessing a manager agent object for loading the manager agent on the instance of the virtual machine that is executing the computing application;
installing the manager agent on the instance of a virtual machine to collect the metrics for the computing application;
invoking the manager agent on the instance of the virtual machine that is executing the computing application to collect the metrics for the computing application over a trend time period;
providing the collected metrics to a cloud manager executing within a hosted service system, the cloud manager being in communication with a rules engine, the rules engine to provide one or more rules for determining, based on the collected metrics, an instruction to automatically alter a current cloud deployment configuration of the computing application;
receiving the instructions to automatically alter the current cloud deployment configuration of the computing application, the instruction generated based on trend data derived from the metrics collected by the manager agent over the extended period of time on the instance of the virtual machine that is executing the computing application; and
automatically altering the current cloud deployment configuration of the computing application based on the trend data.

* * * * *